US011941516B2

(12) United States Patent
Luo et al.

(10) Patent No.: US 11,941,516 B2
(45) Date of Patent: Mar. 26, 2024

(54) COOPERATIVE LEARNING NEURAL NETWORKS AND SYSTEMS

(71) Applicant: MICRON TECHNOLOGY, INC., Boise, ID (US)

(72) Inventors: Fa-Long Luo, San Jose, CA (US); Tamara Schmitz, Scotts Valley, CA (US); Jeremy Chritz, Seattle, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 536 days.

(21) Appl. No.: 15/693,142

(22) Filed: Aug. 31, 2017

(65) Prior Publication Data

US 2019/0065945 A1    Feb. 28, 2019

(51) Int. Cl.
*G06N 3/08* (2023.01)
*G06N 3/04* (2023.01)
(Continued)

(52) U.S. Cl.
CPC ............... *G06N 3/08* (2013.01); *G06N 3/04* (2013.01); *G06N 3/045* (2023.01); *H04W 4/02* (2013.01);
(Continued)

(58) Field of Classification Search
CPC .......... G06N 3/08; G06N 3/04; G06N 3/0454; H04W 4/38; H04W 4/90; H04W 4/40; H04W 4/02; H04W 4/023
See application file for complete search history.

(56) References Cited

U.S. PATENT DOCUMENTS

| 5,377,108 A | 12/1994 | Nishio |
| 6,199,057 B1 | 3/2001 | Tawel |

(Continued)

FOREIGN PATENT DOCUMENTS

| CN | 101547021 A | 9/2009 |
| CN | 101563851 A | 10/2009 |

(Continued)

OTHER PUBLICATIONS

US 11,088,716 B2, 08/2021, Luo et al. (withdrawn)
(Continued)

*Primary Examiner* — Brian M Smith
*Assistant Examiner* — Su-Ting Chuang
(74) *Attorney, Agent, or Firm* — Dorsey & Whitney LLP

(57) ABSTRACT

Systems, methods, and apparatuses related to cooperative learning neural networks are described. Cooperative learning neural networks may include neural networks which utilize sensor data received wirelessly from at least one other wireless communication device to train the neural network. For example, cooperative learning neural networks described herein may be used to develop weights which are associated with objects or conditions at one device and which may be transmitted to a second device, where they may be used to train the second device to react to such objects or conditions. The disclosed features may be used in various contexts, including machine-type communication, machine-to-machine communication, device-to-device communication, and the like. The disclosed techniques may be employed in a wireless (e.g., cellular) communication system, which may operate according to various standardized protocols.

21 Claims, 5 Drawing Sheets

(51) Int. Cl.
　　*G06N 3/045*　　(2023.01)
　　*H04W 4/02*　　(2018.01)
　　*H04W 4/38*　　(2018.01)
　　*H04W 4/40*　　(2018.01)
　　*H04W 4/90*　　(2018.01)

(52) U.S. Cl.
　　CPC ............ *H04W 4/023* (2013.01); *H04W 4/38* (2018.02); *H04W 4/40* (2018.02); *H04W 4/90* (2018.02)

(56) References Cited

U.S. PATENT DOCUMENTS

| | | | |
|---|---|---|---|
| 6,515,978 B1 | 2/2003 | Buehrer et al. | |
| 6,765,495 B1 | 7/2004 | Dunning et al. | |
| 7,965,990 B2 | 6/2011 | Luz et al. | |
| 9,147,353 B1* | 9/2015 | Slusar | G06Q 40/08 |
| 9,172,441 B2 | 10/2015 | Granger-jones et al. | |
| 9,391,680 B2 | 7/2016 | Le-Ngoc et al. | |
| 9,467,220 B2 | 10/2016 | Walsh et al. | |
| 10,050,663 B1 | 8/2018 | Ku et al. | |
| 10,070,432 B1 | 9/2018 | Luo et al. | |
| 10,142,137 B2 | 11/2018 | Luo et al. | |
| 10,185,998 B1* | 1/2019 | Konrardy | G06Q 20/0855 |
| 10,554,375 B2 | 2/2020 | Luo et al. | |
| 10,778,403 B2 | 9/2020 | Luo et al. | |
| 10,805,128 B2 | 10/2020 | Luo et al. | |
| 10,880,132 B1 | 12/2020 | Mirfakhraei et al. | |
| 10,924,139 B2 | 2/2021 | Cong et al. | |
| 10,972,139 B1 | 4/2021 | Luo | |
| 10,979,097 B2 | 4/2021 | Luo | |
| 11,206,050 B2 | 12/2021 | Luo et al. | |
| 11,258,473 B2 | 2/2022 | Luo | |
| 11,552,658 B2 | 1/2023 | Luo et al. | |
| 11,569,851 B2 | 1/2023 | Luo | |
| 11,575,548 B2 | 2/2023 | Luo et al. | |
| 2002/0155821 A1 | 10/2002 | Louis et al. | |
| 2002/0172265 A1 | 11/2002 | Kenney | |
| 2005/0060069 A1* | 3/2005 | Breed | B60N 2/2863 701/408 |
| 2005/0078615 A1 | 4/2005 | Muri | |
| 2006/0162985 A1 | 7/2006 | Tanaka et al. | |
| 2007/0160014 A1 | 7/2007 | Larsson | |
| 2008/0117411 A1 | 5/2008 | Vuong et al. | |
| 2009/0180404 A1 | 7/2009 | Jung et al. | |
| 2009/0233555 A1 | 9/2009 | Nakamura | |
| 2009/0316842 A1 | 12/2009 | Lu et al. | |
| 2010/0027688 A1 | 2/2010 | Suh et al. | |
| 2010/0191391 A1 | 7/2010 | Zeng | |
| 2011/0106442 A1 | 5/2011 | Desai et al. | |
| 2011/0171922 A1 | 7/2011 | Kim et al. | |
| 2011/0216662 A1 | 9/2011 | Nie et al. | |
| 2012/0106405 A1 | 5/2012 | Lioliou et al. | |
| 2012/0170619 A1 | 7/2012 | Chang et al. | |
| 2012/0300680 A1 | 11/2012 | Pietsch et al. | |
| 2013/0044791 A1 | 2/2013 | Rimini et al. | |
| 2013/0084868 A1 | 4/2013 | Song et al. | |
| 2013/0158852 A1 | 6/2013 | Stahlin et al. | |
| 2014/0003264 A1 | 1/2014 | Shin | |
| 2014/0056229 A1 | 2/2014 | Li et al. | |
| 2014/0153494 A1 | 6/2014 | Liu | |
| 2014/0169236 A1 | 6/2014 | Choi et al. | |
| 2014/0219139 A1 | 8/2014 | Choi et al. | |
| 2015/0018043 A1 | 1/2015 | Taniuchi et al. | |
| 2015/0043323 A1 | 2/2015 | Choi et al. | |
| 2015/0055568 A1 | 2/2015 | Jindal et al. | |
| 2015/0085944 A1 | 3/2015 | Mobasher et al. | |
| 2015/0139347 A1 | 5/2015 | Murch et al. | |
| 2015/0140926 A1 | 5/2015 | Fujio et al. | |
| 2015/0146765 A1 | 5/2015 | Moffatt et al. | |
| 2015/0244436 A1 | 8/2015 | Le-ngoc et al. | |
| 2015/0271831 A1 | 9/2015 | Wang et al. | |
| 2015/0311931 A1 | 10/2015 | Rozental et al. | |
| 2016/0036504 A1 | 2/2016 | Khojastepour et al. | |
| 2016/0036582 A1 | 2/2016 | Jana et al. | |
| 2016/0100415 A1 | 4/2016 | Mishra et al. | |
| 2016/0226535 A1 | 8/2016 | Choi et al. | |
| 2016/0226653 A1 | 8/2016 | Bharadia et al. | |
| 2016/0233903 A1 | 8/2016 | Wu et al. | |
| 2016/0261331 A1 | 9/2016 | Osseiran et al. | |
| 2017/0061625 A1* | 3/2017 | Estrada | G06N 3/0454 |
| 2017/0091953 A1* | 3/2017 | Bleiweiss | G06T 7/246 |
| 2017/0104576 A1 | 4/2017 | Liu et al. | |
| 2017/0131719 A1 | 5/2017 | Micks et al. | |
| 2017/0150481 A1 | 5/2017 | Gupta et al. | |
| 2017/0188264 A1 | 6/2017 | Hwang et al. | |
| 2017/0237547 A1 | 8/2017 | Eltawil et al. | |
| 2017/0257180 A1 | 9/2017 | Aggarwal et al. | |
| 2017/0273090 A1 | 9/2017 | Jung et al. | |
| 2017/0303285 A1 | 10/2017 | Kenney et al. | |
| 2018/0006690 A1 | 1/2018 | Shepard et al. | |
| 2018/0006794 A1 | 1/2018 | Lee et al. | |
| 2018/0026775 A1 | 1/2018 | Chen et al. | |
| 2018/0048339 A1 | 2/2018 | Wu et al. | |
| 2018/0062767 A1 | 3/2018 | Vallese et al. | |
| 2018/0076947 A1 | 3/2018 | Kazakevich et al. | |
| 2018/0091284 A1 | 3/2018 | Min et al. | |
| 2018/0123683 A1 | 5/2018 | Wakabayashi et al. | |
| 2018/0152330 A1 | 5/2018 | Chritz et al. | |
| 2018/0159615 A1 | 6/2018 | Kim | |
| 2018/0206176 A1 | 7/2018 | Panteleev et al. | |
| 2018/0254930 A1 | 9/2018 | Luo et al. | |
| 2018/0278290 A1 | 9/2018 | Moorti et al. | |
| 2018/0302048 A1 | 10/2018 | Donoghue et al. | |
| 2018/0309526 A1 | 10/2018 | Zhang et al. | |
| 2018/0315157 A1 | 11/2018 | Ould-Ahmed-Vall et al. | |
| 2018/0367192 A1 | 12/2018 | O'Shea et al. | |
| 2019/0007242 A1 | 1/2019 | Luo et al. | |
| 2019/0020381 A1 | 1/2019 | Tooher et al. | |
| 2019/0027824 A1 | 1/2019 | Pajona et al. | |
| 2019/0028260 A1 | 1/2019 | Karlsson et al. | |
| 2019/0065951 A1 | 2/2019 | Luo et al. | |
| 2019/0081766 A1 | 3/2019 | Luo et al. | |
| 2019/0081767 A1 | 3/2019 | Luo et al. | |
| 2019/0123442 A1 | 4/2019 | Vannucci et al. | |
| 2019/0229884 A1 | 7/2019 | Xue et al. | |
| 2019/0238213 A1 | 8/2019 | Sfar et al. | |
| 2019/0245565 A1 | 8/2019 | Luo et al. | |
| 2019/0245566 A1 | 8/2019 | Luo et al. | |
| 2019/0325928 A1 | 10/2019 | Jain et al. | |
| 2019/0393948 A1 | 12/2019 | Zhao et al. | |
| 2020/0127803 A1 | 4/2020 | Luo et al. | |
| 2020/0196326 A1 | 6/2020 | Li et al. | |
| 2020/0205156 A1 | 6/2020 | Adjakple et al. | |
| 2020/0205230 A1 | 6/2020 | Haustein et al. | |
| 2020/0358177 A1 | 11/2020 | Ge et al. | |
| 2020/0366538 A1 | 11/2020 | Luo et al. | |
| 2020/0405204 A1 | 12/2020 | Howard | |
| 2020/0412518 A1 | 12/2020 | Luo et al. | |
| 2021/0258038 A1 | 8/2021 | Luo | |
| 2021/0275050 A1 | 9/2021 | Ren et al. | |
| 2021/0320678 A1 | 10/2021 | Luo | |
| 2021/0409132 A1 | 12/2021 | Bouttier et al. | |
| 2022/0108157 A1 | 4/2022 | Hunter et al. | |
| 2022/0116130 A1 | 4/2022 | Elmaghbub et al. | |
| 2022/0140850 A1 | 5/2022 | Luo | |
| 2022/0217724 A1 | 7/2022 | Pezeshki et al. | |
| 2022/0353051 A1 | 11/2022 | Luo et al. | |
| 2023/0113877 A1 | 4/2023 | Luo et al. | |
| 2023/0179241 A1 | 6/2023 | Luo | |

FOREIGN PATENT DOCUMENTS

| | | |
|---|---|---|
| CN | 102124665 A | 7/2011 |
| CN | 103780300 A | 5/2014 |
| CN | 104052529 A | 9/2014 |
| CN | 104067585 A | 9/2014 |
| CN | 104468055 A | 3/2015 |
| CN | 104539341 A | 4/2015 |
| CN | 105075157 A | 11/2015 |
| CN | 105594131 A | 5/2016 |
| CN | 105934889 A | 9/2016 |
| CN | 106034097 A | 10/2016 |
| CN | 106134095 A | 11/2016 |

(56) References Cited

FOREIGN PATENT DOCUMENTS

| | | | |
|---|---|---|---|
| CN | 106301419 A | 1/2017 | |
| CN | 106559365 A | 4/2017 | |
| CN | 107124245 A | 9/2017 | |
| CN | 110024345 A | 7/2019 | |
| CN | 110383720 A | 10/2019 | |
| DE | 102015015021 A1 | 5/2016 | |
| EP | 1164758 A2 | 12/2001 | |
| EP | 3075095 A1 | 10/2016 | |
| EP | 3200371 A1 | 8/2017 | |
| JP | 2016529837 A | 9/2016 | |
| JP | 2016225908 A | 12/2016 | |
| KR | 20070116736 A | 12/2007 | |
| KR | 20100095650 A | 8/2010 | |
| KR | 20130132817 A | 12/2013 | |
| KR | 20160090372 A | 7/2016 | |
| KR | 20160127099 A | 11/2016 | |
| KR | 20160146655 A | 12/2016 | |
| KR | 20190091818 A | 8/2019 | |
| WO | 2004095625 A2 | 11/2004 | |
| WO | 2010147280 A1 | 12/2010 | |
| WO | 2016111638 A1 | 7/2016 | |
| WO | 2016154219 A1 | 9/2016 | |
| WO | 2017026970 A1 | 2/2017 | |
| WO | 2017069300 A1 | 4/2017 | |
| WO | 2017121487 A1 | 7/2017 | |
| WO | 2019046103 A1 | 3/2019 | |
| WO | 2019148106 A1 | 8/2019 | |
| WO | 2019156820 A1 | 8/2019 | |
| WO | 2021211560 A1 | 10/2021 | |

OTHER PUBLICATIONS

US 11,424,969 B2, 08/2022, Luo et al. (withdrawn)
A rear-end collision prediction scheme based on deep learning in the Internet of Vehicles Chen Chen a, Hongyu Xiang a, Tie Qiu b, Cong Wanga, Yang Zhou c, Victor Chang d (Year: 2017).
Intrusion Detection System Using Deep Neural Network for In-Vehicle Network Security Min-Joo Kang, Je-Won Kang (Year: 2016).*
Kim, Transfer Learning for Automated Optical Inspection, 2017 International Joint Conference on Neural Networks (IJCNN), Jul. 3, 2017 (Year: 2017).*
Young, Highway Vehicle Accident Reconstruction Using Cooperative Collision Warning Based Motor Vehicle Event Data Recorder, 2009 (Year: 2009).*
Chang, Simulation and Implementation of High-Performance Collision Warning System for Motor Vehicle Safety Using Embedded ANFIS Prediction, 2008 (Year: 2008).*
Kehtarnavaz, A Transportable Neural-Network Approach to Autonomous Vehicle Following, IEEE Transactions on Vehicular Technology, vol. 47, No. 2, May 1998 (Year: 1998).*
Bao Rong Chang, Intelligent data fusion system for predicting vehicle collision warning using vision/GPS sensing, Expert Systems with Applications 37 (2010) 2439-2450 (Year: 2010).*
Lee ("A Study on the Rear-End Collision Warning System by Considering Different Perception-Reaction Time Using Multi-Layer Perceptron Neural Network") 2015 IEEE Intelligent Vehicles Symposium (IV) Jun. 28-Jul. 1, 2015. COEX, Seoul, Korea (Year: 2015).*
Chong_A rule-based neural network approach to model driver naturalistic behavior in traffic Transportation Research Part C 32 (2013) 207-223 (Year: 2013).*
Peng ("Multi-parameter prediction of drivers' lane-changing behaviour with neural network model") Applied Ergonomics vol. 50, Sep. 2015, pp. 207-217 (Year: 2015).*
U.S. Appl. No. 15/890,275 entitled "Self Interference Noise Cancellation to Support Multiple Frequency Bands" filed Feb. 6, 2018.
U.S. Appl. No. 15/701,007 entitled "Full Duplex Device-to-Device Cooperative Communication" filed Sep. 11, 2017
U.S. Appl. No. 16/114,923 titled "Cooperative Learning Neural Networks and Systems" filed Aug. 28, 2018, pp. all.
U.S. Appl. No. 16/116,365 titled "Full Duplex Device-to-Device Cooperative Communication" filed Aug. 29, 2018, pp. all.
U.S. Appl. No. 16/105,915 titled "Wireless Devices and Systems Including Examples of Full Duplex Transmission", filed Aug. 20, 2018, pp. all.
U.S. Appl. No. 16/113,995 titled "Self Interference Noise Cancellation to Support Multiple Frequency Bands"; filed Aug. 27, 2018, pp. all.
U.S. Appl. No. 16/561,868 titled "Wireless Devices and Systems Including Examples of Full Duplex Transmission Using Neural Networks or Recurrent Neural Networks" filed Sep. 5, 2019, pp. all.
U.S. Appl. No. 16/718,930 titled "Full Duplex Device-to-Device Cooperation Communication", filed Dec. 18, 2019, pp. all.
U.S. Appl. No. 15/447,731 entitled "Wireless Devices and Systems Including Examples of Full Duplex Transmission", filed Mar. 2, 2017, pp. all.
International Search Report and Written Opinion of the International Searching Authority for PCT Patent Application No. PCT/US2018/047783 dated Dec. 6, 2018, pp. all.
Anttila, Lauri et al., "Modeling and Efficient Cancellation of Nonlinear Self-Interference in MIMO Full-Duplex Transceivers", IEEE Globecom Workshops, Dec. 2014, 7 pgs.
Geevarghese, Biju et al., "CDMA Interferance Cancellation Techniques Using Neural Networks in Rayleigh Channels", IEEE: International Conference on Information Communication and Embedded Systems (ICICES), Feb. 2013, 5 pgs.
U.S. Appl. No. 16/983,797 titled "Wireless Devices and Systems Including Examples of Full Duplex Transmission" filed Aug. 3, 2020, pp. all.
U.S. Appl. No. 17/018,256 titled "Full Duplex Device-to-Device Cooperative Communication" filed Sep. 11, 2020, pp. all.
U.S. Appl. No. 16/848,514 titled "Self Interference Noise Cancellation to Support Multiple Frequency Bands With Neural Networks or Recurrent Neural Networks" filed Apr. 14, 2020, pp. all.
Extended European Search Report for EP Application No. 18849799.4, dated May 4, 2021.
Anttila, Lauri et al., "Modeling and Efficient Cancellation of Nonlinear Self-Interference in MIMO Full-Duplex Transceivers", IEEE, Oct. 2014, 7 pgs.
Zhang, Zhongshan et al., "Full Duplex Techniquest for 5G Networks: Self-Interference Cancellation, Protocol Design, and Relay Selection", IEEE Communications Magazine, May 2015, 10 pgs.
Young, Chung-Ping, et al., "Highway Vehicle Accident Reconstruction Using Cooperative Collision Warning Based Motor Vehicle Event Data Recorder"; IEEE, 2009, pp. all.
Wang, Li , "Exploiting Full Duplex for Device-to-Device Communications in Heterogeneous Networks", IEEE Communications Magazine, May 2015.
Kristensen, Toftegaard A. et al., "Advanced Machine Learning Techniques for Self-Interference Cancellation in Full-Duplex Radios", 53rd Asilomar Conference on Signals, Systems, and Computers, Date of Conference: Nov. 3-6, 2019, pp. 1-5.
Sulaiman, Ahmed et al., "Elman Recurrent Neural Network Application in Adaptive Beamforming of Smart Antenna System", International Journal of Computer Applications (0975-8887), vol. 129, No. 11, Nov. 2015, pp. 38-43.
Tarver, Chance et al., "Neural Network DPD Via Backpropagation Through Neural Network Model of the PA", 53rd Asilomar Conference on Signals, Systems, and Computers, Date of Conference: Nov. 3-6, 2019, pp. 1-5 and figure 4.
English Translation of Office Action for KR Application No. 10-2020-7007492, dated Mar. 23, 2021, pp. all.
English translation of Final Office Action dated Oct. 20, 2021 for KR Appl. No. 10-2020-7007492.
U.S. Appl. No. 17/811,472 titled "Full Duplex Device-to-Device Cooperative Communication" filed Jul. 8, 2022, pp. all pages of application as filed.
English translation of KR Office Action dated Apr. 8, 2022 for KR Appl. No. 10-2022-7006932; pp. all.
U.S. Appl. No. 17/821,419, titled, "Wireless Devices and Systems Including Examples of Full Duplex Transmission," filed Aug. 22, 2022, pp. all pages of application as filed.

(56) References Cited

OTHER PUBLICATIONS

Campolo, Claudia, et al., "Full-Deplex Radios for Vehicular Communications", IEEE Communications Magazine, Jun. 2017; pp. all.

Tran, et al., "On the Performance of Distributed Space-Time Coded Cooperative Relay Networks Based On Inter-Relay Communications", EURASIP Journal on Wireless Communications and Networking, Oct. 2013; pp. all.

Wang, Li, et al., "Exploiting Full Duplex for Device-to-Device Communications in Heterogeneous Networks", IEEE Communications Magazine, May 2015; pp. all.

U.S. Appl. No. 18/161,600, filed Jan. 30, 2023 titled, "Self Interference Noise Cancellation to Support Multiple Frequency Bands With Neural Networks or Recurrent Neural Networks,"; pp. all pages of application as filed.

English translation of Second KR Office Action dated Nov. 15, 2022 for KR Appl. No. 10-2022-7006932; pp. all.

\* cited by examiner

COOPERATIVE LEARNING NEURAL NETWORKS AND SYSTEMS

TECHNICAL FIELD

Examples described herein relate to communications capabilities of vehicles. Examples of vehicles implementing cooperative learning neural networks are described.

BACKGROUND

Machine learning for vehicle systems has utilized information sensed by the vehicle in order to make future decisions regarding that vehicle. The amount of information which may be obtained from other vehicles has been limited due to the bandwidth available in conventional communication systems. However, this will not be the case with the deployment of 5G wireless communication infrastructure which can provide the sufficient bandwidth such as at the amount of 10 G bits per second.

DETAILED DESCRIPTION

Cooperative learning neural networks may employ machine learning techniques to make decisions based on information gathered from multiple sources that communicate with one another wirelessly. The systems described herein may leverage advanced wireless communication protocols to communicate directly between devices, in machine-to-machine (M2M) fashion, or via a wireless communication network using machine-type communication (MTC). Such advanced wireless communication protocols may allow for high bandwidth or low latency communication that will allow physically separate or remote sensors to gather information and train a neural network.

For example, cooperative learning neural networks described herein may be used to develop weights which are associated with objects or conditions at one device and which may be transmitted to a second device, where they may be used to train the second device to react to such objects or conditions. This is in contrast to prior machine learning solutions in which physically separated sensors could not effectively or timely communicate with one another to allow for training a neural network. The techniques described herein may be applied in a vehicle-to-vehicle context, or they may be employed in other M2M or device-to-device (D2D) schemes.

Figure 1:
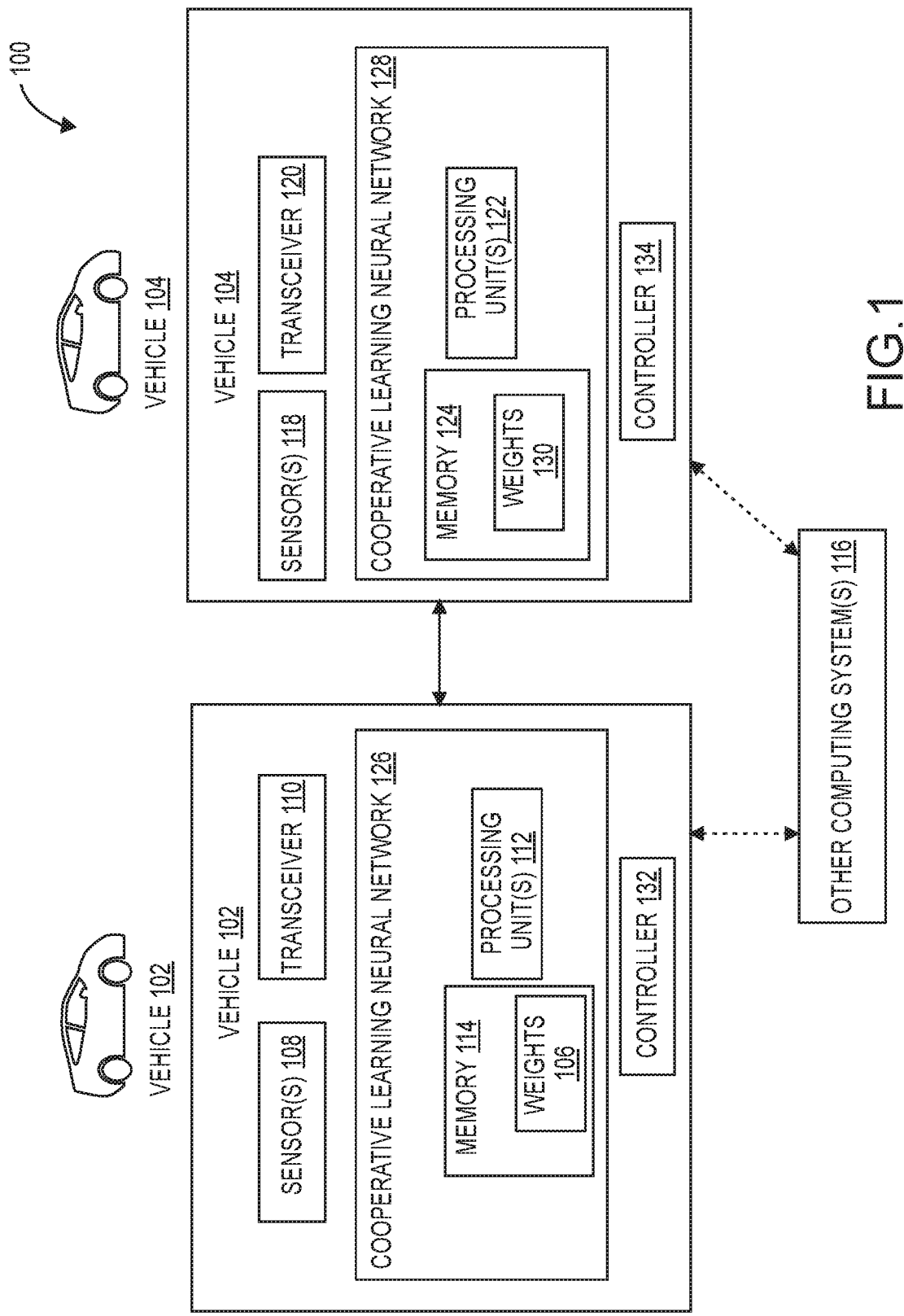
FIG. 1 is a schematic illustration of a system arranged in accordance with examples described herein.

FIG. 1 is a schematic illustration of a system arranged in accordance with examples described herein. The system 100 includes vehicle 102, vehicle 104, and other computing system(s) 116. The vehicle 102 may include sensor(s) 108, transceiver 110, controller 132, and cooperative learning neural network 126, or some combination of such devices. Some or all of sensor(s) 108, transceiver 110, controller 132, and cooperative learning neural network 126 may be components of a subsystem of vehicle 102. The cooperative learning neural network 126 may be implemented using processing unit(s) 112 and memory 114, which may store weights 106. The vehicle 104 may include sensor(s) 118, transceiver 120, controller 134, and cooperative learning neural network 128, or some combination of such devices. Some or all of sensor(s) 118, transceiver 120, controller 134, and cooperative learning neural network 128 may be components of a subsystem of vehicle 104. The cooperative learning neural network 128 may be implemented using processing unit(s) 122 and memory 124, which may store weights 130. While described as vehicles in FIG. 1, vehicles 102 and/or 104 may be generally implemented by one or more wireless communication devices.

While two vehicles are shown in FIG. 1, any number may be present in other examples including 3, 4, 5, 6, 7, 8, 9, 10, 50, 100, 500, 1000, or another number of vehicles. Any of a variety of vehicle types may implement systems and methods described herein including, but not limited to, automobiles (e.g., passenger cars, taxis, ride share vehicles), trucks (e.g., semi-trucks, heavy equipment, service trucks such as but not limited to delivery trucks, garbage trucks, postal vehicles), busses, trains, driverless vehicles, aircraft, helicopters, ships, dirigibles, space vehicles, rockets, submarines, or combinations thereof.

Vehicles described herein, such as vehicle 102 and vehicle 104 of FIG. 1, may be equipped with one or more sensors, such as sensor(s) 108 and sensor(s) 118 of FIG. 1. The sensors may be integrated with the vehicle and placed on, in, around, above, below, and/or proximate to the vehicle. Each sensor may be used to sense one or more environmental parameters. Examples of sensors which may be used include, but are not limited to, optical sensors (e.g., cameras, infrared sensors), temperature sensors, accelerometers, gyroscopes, inertial sensors, humidity sensors, RADAR sensors (e.g., LiDARs), ultrasonic sensors, vehicle parameter sensors (e.g., sensors used to sense a position and/or state of one or more vehicle components, such as but not limited to, a wheel position sensor, a wheel speed sensor, an airspeed sensor), altimeter, or combinations thereof.

Vehicles described herein, such as vehicle 102 and vehicle 104 of FIG. 1, may be equipped with one or more transceivers. The transceiver may include one or more receivers, transmitters, or combinations thereof. Transceivers described herein may be used to transmit and/or receive data from a variety of sources, including other vehicles and/or other computing systems. For example, the transceiver 110 may be used to transmit vehicle data pertaining to vehicle 102, which data may be generated by sensor(s) 108. The transceiver 110 may be used to receive vehicle data pertaining to vehicle 104 or other vehicles, which may be generated by sensor(s) 118. Data transmitted by the transceiver 110 may be received by vehicle 104 and/or other computing system(s) 116. Transceiver 110 may be used to receive data from other computing system(s) 116 in some examples. In an analogous manner, the transceiver 120 may be used to transmit vehicle data pertaining to vehicle 104, which may be generated by sensor(s) 118. The transceiver 120 may be used to receive vehicle data pertaining to vehicle 102, which may be generated by sensor(s) 108. Data transmitted by the transceiver 120 may be received by vehicle 102 and/or other computing system(s) 116. Transceiver 120 may be used to receive data from other computing system(s) 116 in some examples.

Transceivers described herein generally transmit and/or receive data using wireless communication techniques. In some examples, transceivers, such as transceiver 110 and transceiver 120 may communicate using 5G wireless communication techniques. 5G wireless communication techniques may, in some examples, allow for adequate bandwidth and speed of communications such that sensor data from one vehicle (e.g., vehicle 104) may timely be received by another vehicle (e.g., vehicle 102) and utilized by the receiving vehicle to impact the operation of the receiving vehicle (e.g., driving). In some examples, transceivers described herein, such as transceiver 110 and/or transceiver 120 may utilize full duplex communication techniques, including full duplex 5G wireless communication techniques. Accordingly, the transceiver 110 and/or transceiver 120 may substantially simultaneously both transmit and receive data in some examples. The transceiver 110 and/or transceiver 120 may be equipped with interference cancellation circuitry which may facilitate the simultaneous transmission and receipt of data in some examples.

Vehicles described herein, such as vehicle 102 and vehicle 104 of FIG. 1, may include one or more controllers, such as controller 132 and controller 134 shown in FIG. 1. The controllers may provide control signals to one or more components of the vehicle, including control signals used to control operation of the vehicle. For example, the controllers may provide control signals to set and/or adjust a speed and/or heading of the vehicle. Other aspects of the vehicle may be controlled by controllers described herein (e.g., the speed, setting, heading, or operation of any component of the vehicles). Accordingly, the controllers, such as controller 132 and/or controller 134 may be in electrical and/or mechanical (e.g., pneumatic) communication with a variety of components of the vehicle. In some examples, multiple controllers may be provided in each vehicle. Controllers described herein may be in communication, either directly or indirectly through other vehicle components, with sensors of the vehicle, such as sensor(s) 108 and/or sensor(s) 118. In this manner, readings from the sensors may be used as inputs to the controller 134 which may provide control signals according to sensor readings. Controllers described herein may be implemented using any number or variety of processing unit(s), including but not limited to, processors, circuitry (e.g., application specific integrated circuits (ASICs), field programmable gate arrays (FPGAs)), and/or microcontrollers.

Examples of vehicles described herein may implement one or more cooperative learning neural networks, such as cooperative learning neural network 126 and cooperative learning neural network 128 of FIG. 1. Cooperative learning neural networks described herein generally utilize a combination of input from the vehicle in which they are operating and input from one or more other vehicles to implement and/or train the cooperative learning neural network. For example, cooperative learning neural networks described herein may utilize a set of weight or weights to process inputs and provide an output.

Within a cooperative learning neural network, a number of sets of weights may be used to process an input, with each set of weights being indicative of a particular condition to be identified in the input. For example, a set of weights may be associated with each object in an image that it may be desirable for the cooperative learning neural network to identify. A set of weights in different values may be associated, for example, with each of a stop sign, a street sign, a vehicle, a person, a building, a traffic light, a bird, or an animal.

Sets of weights may be provided to or associated with other objects in other examples. Any number of sets of weights may be used to identify objects in images as described herein. In some examples, a set of weights may be associated with a condition that it may be desirable for the cooperative learning neural network to identify. A set of weights in different values may be associated, for example, with a crash condition, such as but not limited to, a rear-end collision, a side-impact crash, an animal condition, a collision with a parked vehicle, and/or a hydroplaning condition. The cooperative learning neural network may be processed with each of a number of sets of weights and a condition and/or object may be recognized by the cooperative learning neural network according to the set of weights which produces a particular output (e.g., a maximum output, a minimum output, and/or a predetermined output).

Cooperative learning neural networks may be implemented using one or more processing units and memory. For example, the cooperative learning neural network 126 may be implemented using processing unit(s) 112 and memory 114, which may store weights 106. The cooperative learning neural network 128 may be implemented using processing unit(s) 122 and memory 124, which may store weights 130. Processing units which may be used to implement cooperative learning neural networks described herein may be implemented using any number or variety of processing unit(s), including but not limited to, processors, circuitry (e.g., application specific integrated circuits (ASICs), field programmable gate arrays (FPGAs)), and/or microcontrollers. Memory which may be used to implement cooperative learning neural networks described herein generally may include any number or type of memory devices, including but not limited to, RAM, ROM, DRAM, Flash, or other memory types or devices. Memory used in cooperative learning neural networks may store weights which may be used to process inputs and provide outputs from cooperative learning neural networks.

Cooperative learning neural networks described herein may utilize input from both the vehicle in which they are operating and another vehicle (and/or multiple other vehicles) in training the cooperative learning neural network and/or in operating the cooperative learning neural network. In some examples, cooperative learning neural networks described herein may be utilized to identify objects in images. During operation, image data may be received by cooperative learning neural network 126 from the vehicle 102, e.g., from sensor(s) 108. Image data may also be received by cooperative learning neural network 126 from the vehicle 104, e.g., from sensor(s) 118 through transceiver 120 and transceiver 110. Both the image data received from the vehicle 102 and the image data received from the vehicle 104 may include image data pertaining to a particular object (e.g., a stop sign). For example, the image data received from the vehicle 102 may include image data relating to a stop sign from one vantage point, while the image data received from the vehicle 104 may include image data relating to the same stop sign from a different vantage point. Both sets of image data, separately or in combination, may be used to train the cooperative learning neural network 126 to develop a set of weights indicative of the object (e.g., a stop sign). In this manner, the weights developed may allow the cooperative learning neural network 126 to more accurately identify a stop sign in image data than if only image data from vehicle 102 had been used.

In some examples, cooperative learning neural networks may utilize only input data from vehicles which are determined to be relevant to an inquiry of the cooperative learning neural network. Accordingly, cooperative learning neural networks may evaluate an identity and/or location of a vehicle providing sensor data and may determine whether to use that sensor data based on the identity and/or location (or other parameter). For example, consider the cooperative learning neural network 126 being used to identify objects in image data. The cooperative learning neural network 126 may utilize image data transmitted only from vehicles which are sufficiently nearby that they are likely to have relevant image data (e.g., they are likely to have captured image data relating to a same object). For example, the cooperative learning neural network 126 may receive a location of vehicle 104 and may only utilize image data received from vehicle 104 when a distance between vehicle 102 and vehicle 104 is less than a threshold distance.

In some examples, cooperative learning neural networks described herein may be utilized to identify a condition (e.g., a crash condition and/or a precursor to a crash condition). Examples of precursors to crash conditions include conditions which are likely to occur prior to a crash condition. Some examples of crash conditions which may commonly cause vehicle crashes include, but are not limited to, rear-end collision, side-impact crash, animal collision, parked vehicle collision, and hydroplaning. Sensor data may be received by cooperative learning neural network 126, for example from sensor(s) 108, which is relevant to the crash condition. For example, considering a rear-end collision, sensor data may be provided to cooperative learning neural network 126 which includes image data from a rear-view camera on vehicle 102. Sensor data from vehicle 104 may be provided to cooperative learning neural network 126 (e.g., from sensor(s) 118 through transceiver 120 and transceiver 110), for example, from a front-facing camera on the vehicle 104 when the vehicle 104 is behind the vehicle 102. Additional sensor data provided from vehicle 104 may include vehicle speed. Both sets of sensor data, separately or in combination, may be used to train the cooperative learning neural network 126 to develop a set of weights indicative of a precursor to the collision condition (e.g., a precursor to a rear-end collision). In this manner, the weights developed may allow the cooperative learning neural network 126 to more accurately identify a precursor to a collision condition from sensor data than if only sensor data from vehicle 102 had been used.

In some examples, cooperative learning neural networks may utilize input data from vehicles which are determined to be relevant to an inquiry of the cooperative learning neural network. Accordingly, cooperative learning neural networks may evaluate an identity and/or location of a vehicle providing sensor data and may determine whether to use that sensor data based on the identity and/or location (or other parameter). For example, consider the cooperative learning neural network 126 being used to identify a rear-end collision. The cooperative learning neural network 126 may utilize image data transmitted only from vehicles which are sufficiently positioned that they are likely to have relevant sensor data (e.g., they are likely to be positioned behind the vehicle 102 and contribute to a rear-end collision). For example, the cooperative learning neural network 126 may receive a location of vehicle 104 and may utilize image data received from vehicle 104 when the vehicle 104 is less than a threshold distance behind the vehicle 102.

In some examples, cooperative learning neural networks may receive weights from another vehicle for use at another vehicle. For example, vehicle 104 may transmit some or all of weights 130 to vehicle 102. The vehicle 102 may store weights received from vehicle 104 in memory 114. Cooperative learning neural network 126 may utilize weights 106, which may include weights received from other vehicles, such as vehicle 104, to analyze inputs.

Examples of systems described herein may include one or more other computing systems, such as other computing system(s) 116 in FIG. 1. The other computing system(s) 116 may be in communication with one or more of the vehicles described herein and may provide all or portions of the processing described herein, and/or may provide additional sensor data for use by cooperative learning neural networks described herein. Examples of other computing system(s) 116 which may be used include, but are not limited to, sensor devices which may transmit data from another location in the environment proximate one or more of the vehicles (e.g., sensors along a road, at a toll booth, in pavement). Other examples of other computing system(s) 116 include computing resources located remotely from one or more vehicles but in electronic communication with the vehicle (e.g., one or more computing resources accessible over a network, from a cloud computing provider, or located in the environment of one or more vehicles).

When a cooperative learning neural network described herein has identified a condition (e.g., identified an object in image data and/or a crash condition), controllers described herein (e.g., the controller 132 and/or controller 134 of FIG. 1) may be used to control components of one or more vehicles responsive to the identification. For example, the controller 132 may provide control signals to slow and/or stop vehicle 102 responsive to cooperative learning neural network 126 identifying an image of a stop sign. As another example, the controller 132 may provide control signals to change direction and/or speed to avoid a rear-end collision responsive to cooperative learning neural network 126 identifying a precursor to a rear-end collision.

Figure 2:
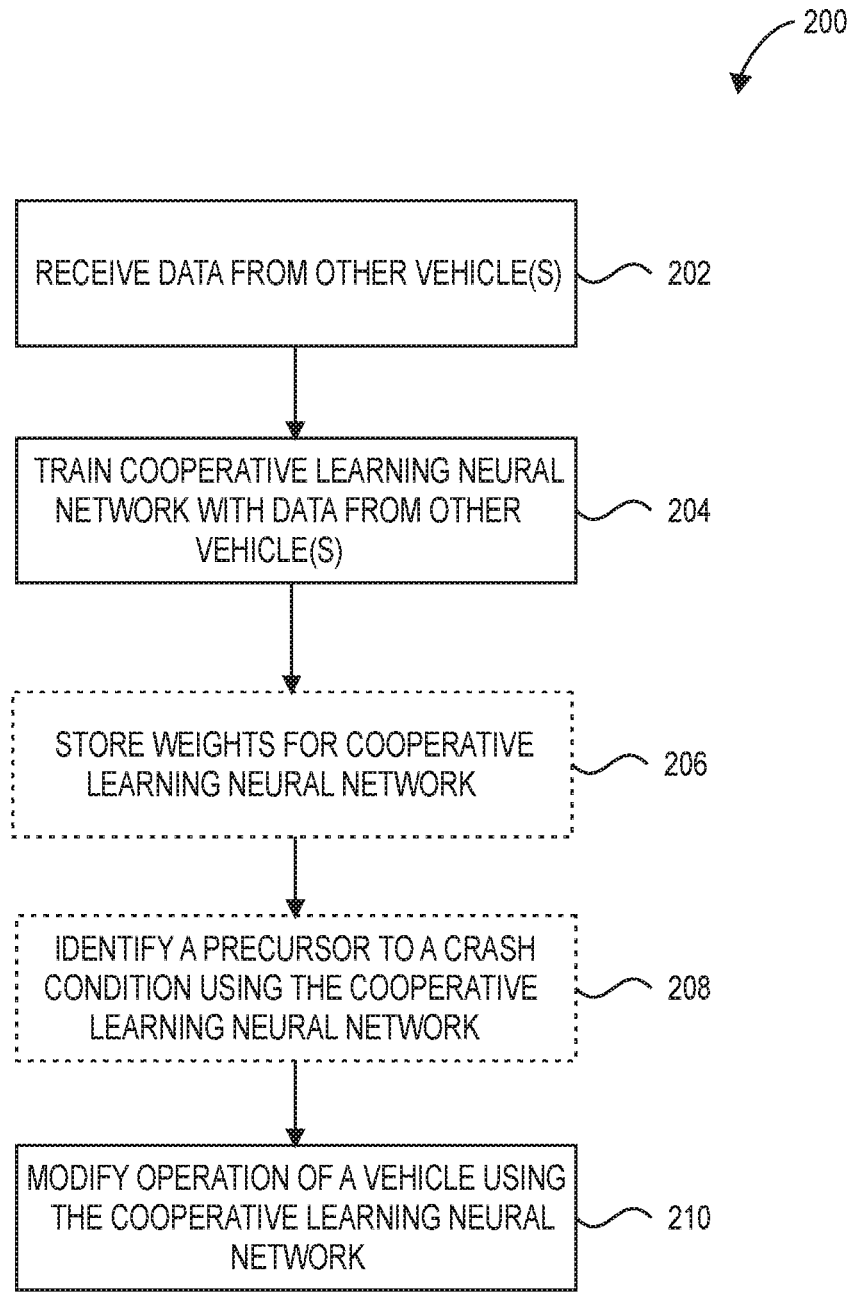
FIG. 2 is a flowchart illustrating a method arranged in accordance with examples described herein.

FIG. 2 is a flowchart illustrating a method arranged in accordance with examples described herein. Method 200 includes block 202, block 204, block 206, block 208, and block 210. In block 202, data may be received from one or more other vehicle(s). In block 204, which may follow block 202, a cooperative learning neural network may be trained with data from these related vehicles such as Vehicle 102 and/or Vehicle 104 of FIG. 1. The block 206 may follow block 204. In block 206, weights for the cooperative learning neural network may be stored. Block 208 may follow block 206. In block 208, a crash condition may be identified using the cooperative learning neural network. Block 210 may follow block 208. In block 210, operation of a vehicle may be modified using the cooperative learning neural network. Additional, fewer, and/or otherwise ordered blocks may be used in other examples. The method 200 may be performed, for example, by vehicles described herein, such as by vehicle 102 and/or vehicle 104 of FIG. 1.

In block 202, data may be received from other vehicle(s). For example, referring back to FIG. 1, data from vehicle 104 may be received at vehicle 102. Data may be wirelessly transmitted from one vehicle to another in examples described herein, such as by utilizing 5G wireless communication techniques. Utilizing 5G wireless communication techniques may allow for sufficient speed and/or bandwidth of data transfer to allow data received from other vehicles to be timely used in controlling a vehicle. Other, legacy communication schemes or protocols that do not support high bandwidth and/or low latency data transfers may be insufficient to transfer enough or timely data to support the techniques described herein.

Data may be received from any number of vehicles including 1, 2, 3, 4, 5, 6, 7, 8, 9, 10, 50, 100, 500, 1000 vehicles, or another number of vehicles in other examples. Data received may represent data generated by sensors of the other vehicles. For example, image data collected from image sensors (e.g., cameras) located on other vehicles may be received in block 202. Other data which may be collected in block 202 includes, but is not limited to, vehicle identity, location, speed, state, destination, or other vehicle, component, or environmental parameters. In some examples, data received in block 202 may be data directly for use by a cooperative learning neural network (e.g., weights for a neural network may be sent from another vehicle and received in block 202). The operations of block 202 may, for example, be performed by a receiving component in a system or subsystem of a vehicle, such as transceiver 110 or transceiver 120.

In block 204, data from other vehicles may be used to train a cooperative learning neural network, such as the cooperative learning neural network 128 and/or cooperative learning neural network 126 of FIG. 1. Data from other vehicles (e.g., data received in block 202) may be combined with data from a vehicle in which the cooperative learning neural network is running in block 204. For example, data may be generated by one or more sensors of the vehicle in which the cooperative learning neural network is operating. The generated data may be used in block 204 together with the data received in block 202 to train the cooperative learning neural network. Both data from the local vehicle and data from other vehicle(s) may be used to train a cooperative learning neural network in block 204.

Generally, a neural network, including cooperative learning neural networks described herein, may be considered as an electronic network of nodes. A set of input values may be provided to the neural network and associated weights may be implemented by the nodes. A function may be used to combine the weights and the input values and map the results to an output. In this manner, based on the output, a neural network may classify the output. Training (e.g., learning) a neural network generally refers to iteratively updating the weights (e.g., parameters) using a rule. Training may utilize two or three kinds of variables in some examples, the input signals (e.g., training samples), targeted outputs (e.g., supervised samples), and initial weights (e.g., all zero, randomly selected, or other initial weight selection).

Training may involve supervised training—e.g., comparing the classification of the input values with a known actual classification of the input values. Errors from an initial classification of the input values may be fed back into the neural network, and used to modify the network (e.g., the weights and/or the function to map to the output) the next time around. Many iterations of adjustment may occur during training. Accordingly, supervised training (e.g., learning) may refer to all three kinds of variables (e.g., input signals, targeted outputs, and initial weights) are used to update the weights. Examples of supervised training methodologies may include linear regression, random forest, and support vector machines. In some examples, training may involve unsupervised training—e.g., using a methodology to model the underlying structure or distribution in the input data in order to classify the data. Unsupervised learning (e.g., self-learning) may refer to the use of input signals and initial weights, without the use of targeted outputs, to update the weights of the neural network. For example, no targeted output may be provided in unsupervised learning examples. Examples of unsupervised learning methodologies include k-means methodologies and a priori methodologies.

Cooperative leaning neural networks described herein generally refer to neural networks where the input signals and/or targeted outputs may come from different sources or different objects. For example, some of the input signals and/or targeted outputs used may be communicated to the cooperative learning neural networks over a wireless communications network (e.g., a 5G communications network).

5G communication systems may allow cooperative learning neural networks described herein to train using sensor data communicated over the 5G communication system. Generally, to be usable in a real-time setting, it may not be feasible without a high bandwidth 5G communication system to make use of sensor data communicated from another device. By real-time, herein generally may refer to occurring within a threshold time that is based at least in part on the condition identified. For example, real-time may refer to occurring with an amount of time where an action may be taken to avoid a crash condition described herein. By allowing for higher bandwidth communication of sensor data, 5G communication systems described herein may facilitate cooperative learning neural networks which may make use of sensor data communicated over the 5G communication system.

As a result of the training, the cooperative learning neural network may develop sets of weights, each of which correspond to an identifiable condition (e.g., an object in an image and/or a precursor to a crash condition). The weights developed as a result of training in block 204 may allow the cooperative learning neural network to more accurately identify a condition (e.g., an object in an image and/or a precursor to a crash condition) than training based solely on sensor data from the single vehicle in which the cooperative learning neural network is operating. In some examples, training in block 204 may be unsupervised training. In some examples, training in block 204 may be supervised training (e.g., training which occurs with reference to one or more known objects and/or conditions). The operations of block 204 may, for example, be performed by a cooperative learning neural network in a system or subsystem of a vehicle, such as cooperative learning neural network 126 and/or cooperative learning neural network 128 of FIG. 1.

In some examples, one or more criteria may be used to identify vehicles from which inputs may be used in block 204. For example, vehicles who may have data relevant to a condition and/or image to be identified may be used in block 204. Considering the case of a cooperative learning neural network which may identify a precursor to a rear-end collision, for example, data from one or more vehicles behind a vehicle receiving the data may be used to train in block 204. A location of various vehicles may be provided to a vehicle and the location of the vehicle may be used to determine whether other data from that vehicle will be used in training in block 204. For example, data from vehicles that are within a threshold distance of the receiving vehicle may be used in some examples. Considering the case of a cooperative learning neural network which may identify an object from an image, data from vehicles in a location which are likely to have a view of the object may be used in block 204.

In block 206, weights may be stored for use by a cooperative learning neural network. The weights may be the weights calculated during the training in block 204 and/or may be the weights which may be received from other vehicles. Weights may be stored in memory, e.g., memory 124 and/or memory 114 of FIG. 1. The operations of block 206 may, for example, be performed by a cooperative learning neural network in a system or subsystem of a vehicle, such as cooperative learning neural network 126 and/or cooperative learning neural network 128 of FIG. 1.

In block 208, during operation of a vehicle implementing a cooperative learning neural network, a precursor to a crash condition may be identified using the cooperative learning neural network. For example, input data from multiple vehicles may be input to a cooperative learning neural network. The cooperative learning neural network may analyze the input data using the stored weights. Based on the analysis, a condition may be identified. For example, the set of weights may be identified by the cooperative learning neural network which produce a particular output (e.g., a maximum output, a minimum output, or a predetermined output) responsive to inputs received during use. The set of weights may be indicative of a condition (e.g., a precursor to a crash condition). In this manner, the condition may be identified by the cooperative learning neural network. The operations of block 204 may, for example, be performed by a cooperative learning neural network in a system or subsystem of a vehicle, such as cooperative learning neural network 126 and/or cooperative learning neural network 128 of FIG. 1.

In some examples, an object in image data provided to the cooperative learning neural network may be identified instead of or in addition to block 208. For example, input data representing images from multiple vehicles may be inputted to a cooperative learning neural network. The cooperative learning neural network may analyze the input data using the stored weights. Based on the analysis, an object in the image data may be identified. For example, the set of weights may be identified by the cooperative learning neural network which produce a particular output (e.g., a maximum output, a minimum output, or a predetermined output) responsive to inputs received during use. The set of weights may be indicative of an object (e.g., a stop sign, street sign, person, animal, building). In this manner, the object may be identified by the cooperative learning neural network.

In block 210, operation of a vehicle may be modified using the cooperative learning neural network. For example, the cooperative learning neural network may identify an object in an image and/or a precursor to a crash condition. Responsive to the identification, a controller in the vehicle running the cooperative learning neural network and/or in another vehicle may take action to modify operation of the vehicle. For example, responsive to identification of a stop sign in an image, the vehicle may be controlled to slow and/or stop. Responsive to identification of a precursor to a crash condition, the vehicle may change speed, direction, or other parameter, to avoid the crash condition. The operations of block 204 may, for example, be performed by a cooperative learning neural network in a system or subsystem of a vehicle, such as cooperative learning neural network 126 and/or cooperative learning neural network 128 of FIG. 1

Figure 3:
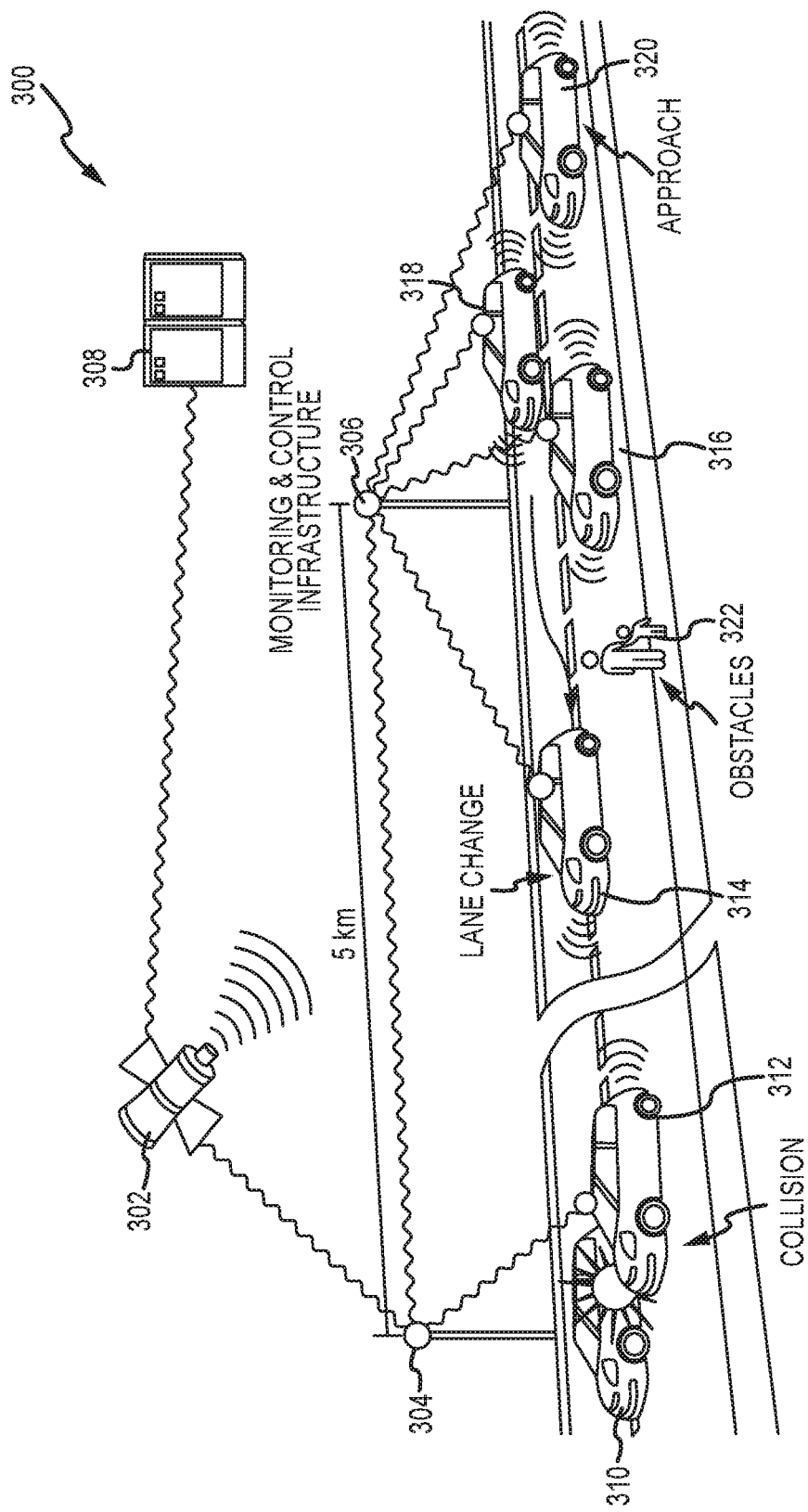
FIG. 3 is a schematic illustration of an example system arranged in accordance with examples described herein.

FIG. 3 is a schematic illustration of an example system arranged in accordance with examples described herein. The system 300 includes satellite 302, monitoring infrastructure 304, monitoring infrastructure 306, computing system 308, vehicle 310, vehicle 312, vehicle 314, vehicle 316, vehicle 318, and vehicle 320. Other, fewer, and/or different components may be used in other examples. Any of the vehicles 310-320 may be implemented by and/or used to implement vehicles described herein, such as vehicle 102 and vehicle 104 of FIG. 1. Any of the vehicles 310-320 may implement cooperative learning neural networks as described herein, such as with reference to FIG. 2.

FIG. 3 illustrates that data generated by sensors on vehicles in systems described herein may be communicated to a variety of systems and devices. In some examples, data generated by any of the vehicles 310-320 may be transmitted directly to any of the other vehicles, e.g., using transceivers included in the vehicles as described herein. In some examples, data generated by any of the vehicles 310-320 may be communicated to other vehicles and/or systems (e.g., computing system 308) using communications infrastructure, such as monitoring infrastructure 304, monitoring infrastructure 306, and/or satellite 302. In some examples, monitoring infrastructure 304, monitoring infrastructure 306, and/or satellite 302 may be included in 5G communications infrastructure. In some examples, data may be received by any of the vehicles 310-320 using communications infrastructure such as monitoring infrastructure 304, monitoring infrastructure 306, and/or satellite 302. Other computing systems, such as computing system 308 may provide data for transmission to any of the vehicles 310-320, which data may be communicated, e.g., using monitoring infrastructure 304, monitoring infrastructure 306, and/or satellite 302.

Data may initially be obtained with one or more sensors associated with the vehicles 310-320. The sensor data may itself be referred to as "raw data"—e.g., data which may be captured by a sensor without additional processing, compression, conversion, scaling, or the like. One or more subsystems described herein may process the raw data (e.g., compress and/or evaluate the raw data) to provide processed data.

Accordingly, in some examples, the vehicles 310-320 may transmit data among one another. The data communicated may include any sensor data (e.g., speed, location, environmental condition, component status and/or condition, direction). 5G communication techniques may be used to transmit and receive data among vehicles described herein. In some examples, all or portions of raw sensor data (e.g., unprocessed camera captured-signals and sensor data) may be communicated between vehicles. In this manner, one vehicle may utilize raw sensor data from another vehicle in a same manner as though the data originated from a sensor of the first vehicle. In some examples, the use of 5G communications techniques may provide sufficient speed and/or bandwidth to make the transmission of raw sensor data sufficiently timely that the raw data may be used to timely make adjustments to vehicle operation.

Vehicles 310-320 may transmit data among and between one another regarding objects and/or conditions identified using cooperative learning neural networks described herein. The data may be unicast and/or broadcast. In some examples, a vehicle may transmit data with an identified recipient (e.g., another particular vehicle). In some examples, a vehicle may broadcast and/or multicast data without, or in addition to, identifying a particular recipient. Objects in the environment, surroundings, and/or traffic may be communicated from one vehicle to another. 5G communication techniques may be used to transmit and receive data among vehicles described herein.

Vehicles 310-320 may transmit all or portions of data (e.g., speed, location, environmental condition, component status and/or condition, direction) to one or more remote computing systems, such as computing system 308. 5G communication techniques may be used to communicate with the remote computing system. The remote computing system may be implemented using, for example, a cloud-based computing system (e.g., a remote server, a computing system of a wireless service provider), and/or computing resources made available through one or more service providers. In an analogous manner, vehicles 310-320 may transmit data regarding objects and/or conditions identified using cooperative learning neural networks described herein to remote computing systems, such as computing system 308. For example, objects in the environment, surroundings, and/or traffic may be communicated from a vehicle to a remote computing system.

In some examples, all or portions of raw sensor data (e.g., unprocessed camera captured-signals and sensor data) may be communicated between a vehicle and a remote computing system, such as computing system 308. In some examples, the use of 5G communications techniques may provide sufficient speed and/or bandwidth to make the transmission of raw sensor data sufficiently timely that the raw data may be used to timely make adjustments to vehicle operation.

In this manner, cooperative learning neural networks may be used to identify objects, e.g., obstacle 322 which may be one or more people along a roadway. Other obstacles may also be identified, such as but not limited to, debris, road kill, buildings, animals, or combinations thereof. For example, data from vehicle 314 and vehicle 316 may be used to train a cooperative learning neural network to identify obstacle 322.

Cooperative learning neural networks described herein may also be used to detect precursors to collision conditions, such as a possible collision between vehicle 310 and vehicle 312 depicted in FIG. 3. Data from vehicle 310 and vehicle 312 may be used to train a cooperative learning neural network in vehicle 310 and/or vehicle 312 to identify precursors to the possible collision. A possibility of a rear-end collision between vehicle 316 and vehicle 320 may be monitored by a cooperative learning neural network in vehicle 316 and/or vehicle 320. For example, data from both vehicle 316 and vehicle 320 may be used to train a cooperative learning neural network in vehicle 316 and/or vehicle 320 to identify a precursor to a rear-end collision condition.

Other conditions and/or objects may also be identified, such as a lane change by one or more vehicles. A lane change of vehicle 314 is depicted in FIG. 3.

Figure 4:
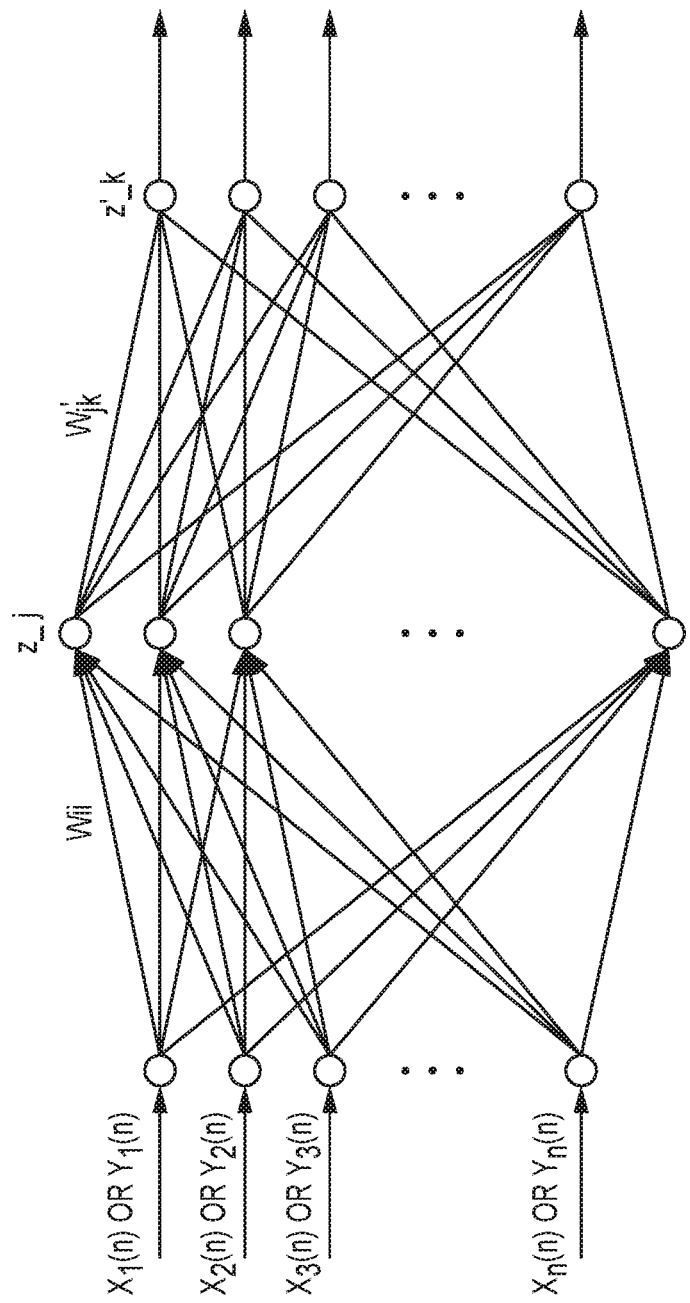
FIG. 4 is a schematic illustration of a cooperative learning neural network arranged in accordance with examples described herein.

FIG. 4 is a schematic illustration of a cooperative learning neural network arranged in accordance with examples described herein. For example, the cooperative learning neural network 400 may be used to implement and/or may be implemented by cooperative learning neural networks described herein including cooperative learning neural network 128 and/or cooperative learning neural network 126 of FIG. 1.

The cooperative learning neural network 400 includes an input layer including a number of input variables. The cooperative learning neural network 400 includes a hidden layer including a number of hidden layer variables $z_j$. The cooperative learning neural network 400 includes an output layer including a number of output layer variables $z'_k$. Generally, the cooperative learning neural network 400 operates by combining inputs from the input layer in weighted combinations using weights $w_{ij}$ to calculate hidden layer variables $z_j$. The hidden layer variables are combined in weighted combinations using weights $w'_{jk}$ to calculate output layer variables $z'_k$. While a single hidden layer is shown in FIG. 4, any number of hidden layers may be used in cooperative learning neural networks described herein.

The weights $w_{ij}$ and $w'_{jk}$ may be used to implement and/or may be implemented by weights described herein, such as weights 106 and/or weights 130 of FIG. 1. A constraint may be evaluated against the output layer variables $z'_k$ to identify an object and/or condition described herein. For example, a function of the output layer variables may be evaluated, and the weights which minimize, maximize, or produce a pre-determined value of that function, may be selected. The condition and/or object associated with those weights may then be identified as present in the input.

For example, different conditions and/or objects may make the weights converge to different values. For instance, for a "stop" sign, the values of the first weight may converge to 0.5, the value of the second weight may be 0.3, the rest of the weights may be zero. However, for a different object, such as a building, the value of the third weight may be 0.6 but the rest of the weights may be 0.5. Examples of cooperative neural networks described herein may provide more accurate weights to identify each object and/or condition than using data from each vehicle separately.

As described herein, inputs from multiple vehicles may be used as input to a cooperative learning neural network. Suppose that $x_1(n), x_2(n), \ldots x_M(n)$ and $y_1(n), \ldots y_N(n)$ are input vectors of two vehicles (e.g., vehicle 102 and vehicle 104 of FIG. 1) at time n. The input vectors may be supplied as the variables of the input layer shown in FIG. 4. The input vectors may contain values representing any of a variety of values, such as pixel intensity and/or color values of pixels in an image, and/or one or more sensor values.

A weighted function, an H matrix, may represent a transfer function of variables common to the input vectors used as inputs to the cooperative learning neural network (e.g., of the multiple vehicles used as inputs). In this manner, the outputs may be determined based on the weighted function in conjunction with weights which are specific to (e.g., associated with) the predicted output specific to each of the input vehicles. In this manner, the weights and predicted outputs of the cooperative learning neural network 400, U and V vectors, may be represented mathematically as follows:

$$W_x(n+1) = W_x(n) + \gamma_x z_x(n)(U(n) - z_x(n)W_x(n)) \quad (1)$$

$$W_y(n+1) = W_y(n) + \gamma_y z_y(n)(V(n) - z_y(n)W_y(n))$$

$$z_x(n) = W_x^H(n)U(n) = \sum_{i=1}^{M} w_x(i,n)u_i(n)$$

$$z_y(n) = W_y^H(n)Y(n) = \sum_{i=1}^{M} w_y(i,n)v_i(n)$$

$$W_x(n) = [w_x(1,n), w_x(2,n), \ldots w_x(M,n)]$$

$$W_y(n) = [w_y(1,n), w_x(2,n), \ldots w_y(M,n)]$$

$$U(n) = [u_1(n), u_2(n), \ldots u_M(n)]$$

$$V(n) = [v_1(n), v_2(n), \ldots v_M(n)]$$

$$\begin{pmatrix} u_i(n) \\ v_i(n) \end{pmatrix} = \begin{pmatrix} h_{11}(n), & h_{12}(n) \\ h_{21}(n), & h_{22}(n) \end{pmatrix} \begin{pmatrix} x_i(n) \\ y_i(n) \end{pmatrix}$$

$$0 < \gamma_x < 1$$

$$0 < \gamma_y < 1$$

$$|h_{11}(n)|, |h_{12}(n)|, |h_{21}(n)|, |h_{22}(n)| \le 1$$

where γ is a learning rate. Note that γ and/or H may be bounded by unity in some examples.

Eq.(1) is an examples representative of unsupervised learning and cooperative learning where the weights W(n+1) may be totally calculated by the initial weights W(0) and input signals (e.g., the first input x(n) from vehicle X and the second input from the vehicle Y).

In some examples, the cooperative learning neural network may utilize unsupervised learning. Unsupervised learning may refer to learning that does not rely on comparison to reference images and/or reference data from known conditions. The unsupervised learning may have a large dynamic range and/or take a lengthy amount of time for convergence. This may increase the complexity of hardware used to implement the cooperative learning neural network and/or time taken to implement the cooperative learning neural network. For example, the value of w(1,n), w(2,n), etc. may be very large and/or very small, which may necessitate a larger hardware resource than desired. In some examples, a norm-bounded learning algorithm may be used, which may be expressed as follows:

$$W(n+1) = W(n) + \gamma z(n)(b(n)X(n) - z(n)W(n)) \quad (2)$$

$$b(n) = W^H(n)W(n) = \sum_{i=1}^{M}|w(i,n)|^2$$

$$z(n) = W^H(n)X(n) = \sum_{i=1}^{M}w(i,n)x_i(n)$$

$$W(n) = [w(1,n), w(2,n), \ldots w(M,n)]$$

$$X(n) = [x_1(n), x_2(n), \ldots x_M(n)]$$

$$0 < \gamma < 1$$

such that $$b(n)=W^H(n)W(n)=W^H(0)W(0)=b(0) \quad (3)$$

In this manner, the value of the weights which may be provided by the cooperative learning neural network are bounded by the initial weights.

If the weights have a very large dynamic value range, more bits (e.g., 64 or 32 bits) operations or even floating-point operations may be needed for each computation step in order to provide sufficient precision. However, if the dynamic range is small, e.g., 16 bit or 8 bit, smaller operations may be sufficient. By adding one more multiplication, examples of the norm-bounded algorithm described herein may perform the normalization processing in each step of the training so that the value of each weight may be limited to a normalized range.

Figure 5:
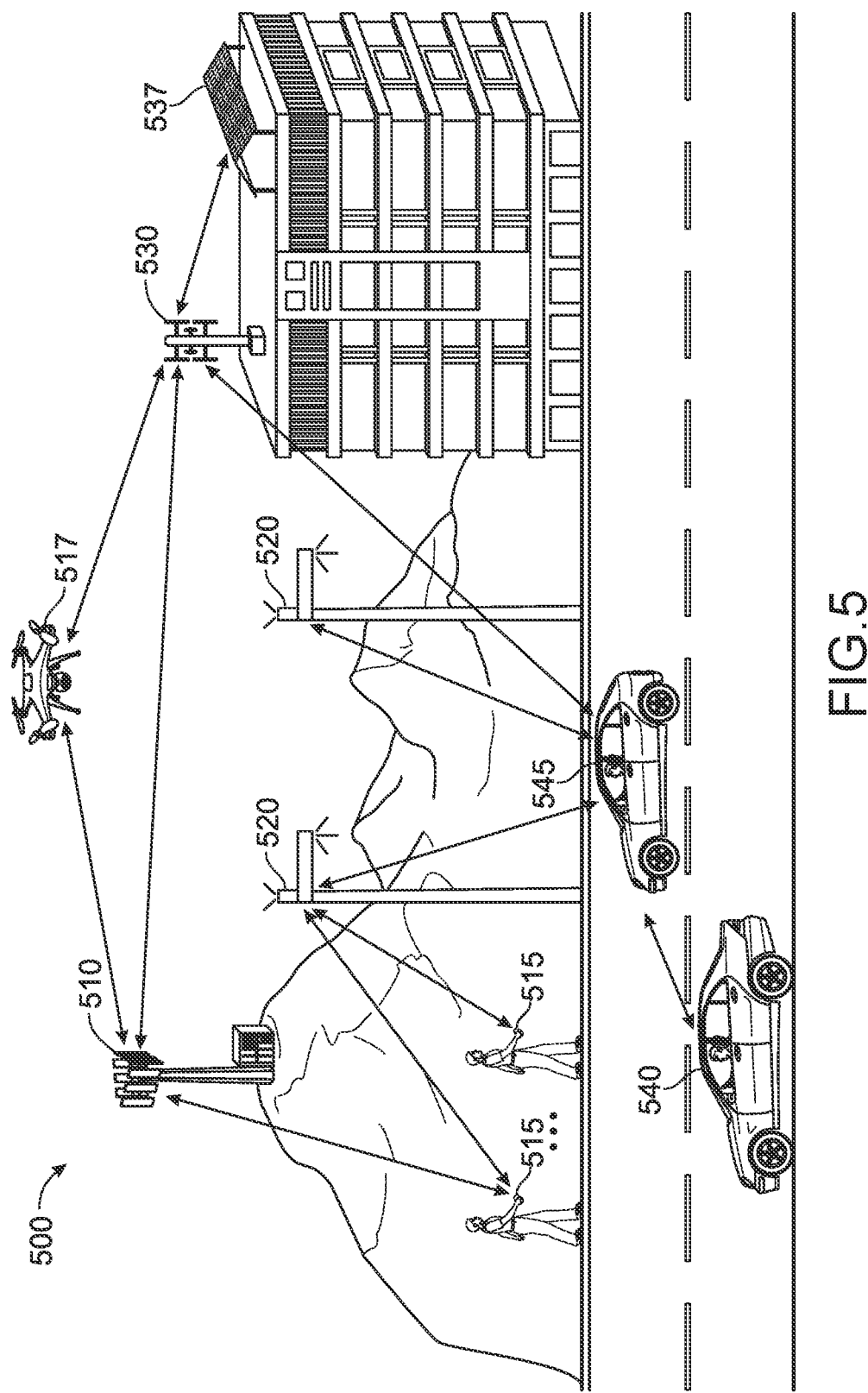
FIG. 5 is a schematic illustration of a wireless communications system arranged in accordance with aspects of the present disclosure.

FIG. 5 illustrates an example of a wireless communications system 500 in accordance with aspects of the present disclosure. The wireless communications system 500 includes a base station 510, mobile devices 515, a drone (or unmanned aerial vehicle) 517, a small cell 530, and vehicles 540, 545. Vehicles 540, 545 may be used to implement and/or may be implemented by vehicles described herein, such as the vehicles 102 and/or 104 of FIG. 1. For example, vehicles 540 and 545 may include a cooperative learning neural network as described herein. In some examples, mobile devices 515 and or drone 517 include cooperative learning neural networks.

The base station 510 and small cell 530 may be connected to a network that provides access to the Internet and traditional communication links. The system 500 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as New Radio (NR) Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 500 may depict aspects of a radio access network (RAN), and system 500 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 510, communication devices 520, and small cells 530 may be coupled with the core network or with one another, or both, via wired or wireless backhaul links (e.g., S1 interface, X2 interface, etc.).

The system 500 may provide communication links with devices or "things," such as sensor devices, e.g., solar cells 537, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 500 to operate at a sub-6 GHz band or other industrial, scientific, and medical (ISM) radio bands where devices may operate on a shared spectrum for unlicensed uses.

The sub-6 GHz band may also be characterized as an NB-IoT band. For example, in operating at low frequency ranges, devices providing sensor data for "things," such as solar cells 537, may utilize less energy, resulting in power-efficiency and may utilize less complex signaling frameworks, such that devices may transmit asynchronously on that sub-6 GHz band. The sub-6 GHz band may support a wide variety of use cases, including the communication of sensor data from various sensors devices. Examples of sensor devices include sensors for detecting energy, heat, light, vibration, biological signals, distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff, paging, radio resource configuration reselection etc.).

By way of example, mobile device 515 may receive sensor data from the user utilizing the mobile device 515, and may transmit that sensor data on a narrowband IoT frequency band to base station 510. In such an example, some parameters for the determination by the mobile device 515 may include availability of licensed spectrum, availability of unlicensed spectrum, and/or time-sensitive nature of sensor data.

Additionally or alternatively, mobile device 515 may form device-to-device (D2D) connections with other mobile devices or other elements of the system 500. For example, the mobile device 515 may form RFID, WiFi, MultiFire, Bluetooth, or Zigbee connections with other devices, including communication device 520 or vehicle 545. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 515 to provide information (e.g., sensor data) collected on different frequency bands than a frequency band determined by mobile device 515 for transmission of that information.

Moreover, some communication devices may facilitate ad-hoc networks, for example, a network being formed with communication devices 520 attached to stationary objects (e.g., lampposts in FIG. 5) and the vehicles 540, 545, without a traditional connection to a base station 510 and/or a core network necessarily being formed. Other stationary objects may be used to support communication devices 520, such as, but not limited to, trees, plants, posts, buildings, blimps, dirigibles, balloons, street signs, mailboxes, or combinations thereof. In such a system 500, communication devices 520 and small cell 530 (e.g., a picocell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 515 communicating with base station 510 on a cellular communication band.

The communication devices 520 may form wireless networks, operating in either a hierarchal or ad-hoc network fashion, depending, in part, on the connection to another element of the system 500. For example, the communication devices 520 may utilize a 700 MHz communication frequency to form a connection with the mobile device 515 in an unlicensed spectrum, while utilizing a licensed spectrum communication frequency to form another connection with the vehicle 545. Communication devices 520 may communicate with vehicle 545 on a licensed spectrum to provide direct access for time-sensitive data, for example, data for an autonomous driving capability of the vehicle 545 on a 5.9 GHz band of Dedicated Short Range Communications (DSRC).

Vehicles 540 and 545 may form an ad-hoc network at a different frequency band than the connection between the communication device 520 and the vehicle 545. For example, for a high bandwidth connection to provide time-sensitive data between vehicles 540, 545, a 24 GHz mmWave band may be utilized for transmissions of data between vehicles 540, 545. For example, vehicles 540, 545 may share real-time directional and navigation data with each other over the connection while the vehicles 540, 545 pass each other across a narrow intersection line. Each vehicle 540, 545 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 520 and the vehicle 545, for example, for processing of image data received at both vehicle 545 and vehicle 540, as transmitted by the vehicle 540 to vehicle 545 over the 24 GHz mmWave band. While shown as automobiles in FIG. 5, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 500 in other mmWave bands or other frequency bands, such as 28 GHz, 37 GHz, 38 GHz, 39 GHz, which may be licensed or unlicensed bands. In some cases, vehicles 540, 545 may share the frequency band that they are communicating on with other vehicles in a different network. For example, a fleet of vehicles may pass vehicle 540 and, temporarily, share the 24 GHz mmWave band to form connections among that fleet, in addition to the 24 GHz mmWave connection between vehicles 540, 545. As another example, communication device 520 may substantially simultaneously maintain a 700 MHz connection with the mobile device 515 operated by a user (e.g., a pedestrian walking along the street) to provide information regarding a location of the user to the vehicle 545 over the 5.9 GHz band. In providing such information, communication device 520 may leverage antenna diversity schemes as part of a massive MIMO framework to facilitate time-sensitive, separate connections with both the mobile device 515 and the vehicle 545. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 510 and small cell 530 may wirelessly communicate with devices in the system 500 or other communication-capable devices in the system 500 having at the least a sensor wireless network, such as solar cells 537 that may operate on an active/sleep cycle, and/or one or more other sensor devices. The base station 510 may provide wireless communications coverage for devices that enter its coverages area, such as the mobile device 515 and the drone 517. The small cell 530 may provide wireless communications coverage for devices that enter its coverage area, such as near the building that the small cell 530 is mounted upon, such as vehicle 545 and drone 517.

Generally, a small cell 530 may be referred to as a picocell and provide coverage for a local geographic region, for example, coverage of 200 meters or less in some examples. This may be contrasted with at macrocell, which may provide coverage over a wide or large area on the order of several square miles or kilometers. In some examples, a small cell 530 may be deployed (e.g., mounted on a building) within some coverage areas of a base station 510 (e.g., a macrocell) where wireless communications traffic may be dense according to a traffic analysis of that coverage area. For example, a small cell 530 may be deployed on the building in FIG. 5 in the coverage area of the base station 510 if the base station 510 generally receives and/or transmits a higher amount of wireless communication transmissions than other coverage areas of that base station 510. A base station 510 may be deployed in a geographic area to provide wireless coverage for portions of that geographic area. As wireless communications traffic becomes more dense, additional base stations 510 may be deployed in certain areas, which may alter the coverage area of an existing base station 510, or other support stations may be deployed, such as a small cell 530. Small cell 530 may be a femtocell, which may provide coverage for an area smaller than a picocell (e.g., 100 meters or less in some examples (e.g., one story of a building)).

While base station 510 and small cell 530 may provide communication coverage for a portion of the geographical area surrounding their respective areas, both may change aspects of their coverage to facilitate faster wireless connections for certain devices. For example, the small cell 530 may primarily provide coverage for devices surrounding or in the building upon which the small cell 530 is mounted. However, the small cell 530 may also detect that a device has entered is coverage area and adjust its coverage area to facilitate a faster connection to that device.

For example, a small cell 530 may support a massive MIMO connection with the drone 517 and, when the vehicle 515 enters it coverage area, the small cell 530 adjusts some antennas to point directionally in a direction of the vehicle 545, rather than the drone 517, to facilitate a massive MIMO connection with the vehicle, in addition to the drone 517. In adjusting some of the antennas, the small cell 530 may not support as fast as a connection to the drone 517, as it had before the adjustment. However, the drone 517 may also request a connection with another device (e.g., base station 510) in its coverage area that may facilitate a similar connection as described with reference to the small cell 530, or a different (e.g., faster, more reliable) connection with the base station 510. Accordingly, the system 530 may enhance existing communication links in providing additional connections to devices that may utilize or demand such links. For example, the small cell 530 may include a massive MIMO system that directionally augments a link to vehicle 545, with antennas of the small cell directed to the vehicle 545 for a specific time period, rather than facilitating other connections (e.g., the small cell 530 connections to the base station 510, drone 517, or solar cells 537). In some examples, drone 517 may serve as a movable or aerial base station.

The wireless communications system 500 may include devices such as base station 510, communication device 520, and small cell 530 that may support several connections to devices in the system 500. Such devices may operate in a hierarchal mode or an ad-hoc mode with other devices in the network of system 500. While described in the context of a base station 510, communication device 520, and small cell 530, it can be appreciated that other devices that can support several connections with devices in the network may be included in system 500, including but not limited to: macrocells, femtocells, routers, satellites, and RFID detectors.

The wireless communication system 500 may support higher bandwidth and/or lower latency communications with the techniques described above. Devices with system 500 may therefore leverage such techniques to exchange data for the benefit of training and utilizing cooperative learning neural networks, as described with reference to the preceding figures.

Certain details are set forth above to provide a sufficient understanding of described embodiments. However, it will be clear to one skilled in the art that embodiments may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
    identifying, at a first wireless communication device, first raw data from a first sensor of a first wireless communication device;
    identifying a second wireless communication device;
    receiving, directly at the first wireless communication device, second raw data from a second sensor of the second wireless communication device, the second raw data received directly from the second wireless communication device in response to capture of the second raw data at the second sensor, where the second raw data is received at the first wireless communication device while the first wireless communication device is in communication with the second wireless communication device;
    training one or more weights of a cooperative learning neural network, at the first wireless communication device using a combination of the first raw data and the second raw data received from the second sensor of the second wireless communication device, wherein the one or more weights are associated with one or more crash conditions or one or more objects, wherein, responsive to identifying that the second wireless communication device is within a threshold distance of the first wireless communication device, and responsive to the receiving of the second raw data, training the cooperative learning neural network at the first wireless communication device using the combination of the first raw data and the second raw data occurs while the second wireless communication device is within the threshold distance of the first wireless communication device, and training the cooperative learning neural network using the combination of the first raw data and the second raw data does not occur, otherwise;
    detecting at least one crash condition or an object using the trained one or more weights; and
    adjusting a speed or direction, or both, of the first wireless communication device responsive to identifying the at least one crash condition.

2. The method of claim 1, wherein the first and second wireless communication devices comprise vehicles.

3. The method of claim 1, wherein the first raw data or the second raw data, or both, comprise image data.

4. The method of claim 1, further comprising determining that the second wireless communication device is within the threshold distance.

5. The method of claim 1, wherein said training comprises generating weights for the cooperative learning neural network.

6. The method of claim 1, wherein the weights are indicative of an object.

7. The method of claim 1, further comprising using the cooperative learning neural network to identify at least one crash condition.

8. The method of claim 1, wherein said training comprises supervised training based on a set of references.

9. The method of claim 1, wherein receiving the second data comprises:
    receiving the second data from a node of a wireless communication network configured according to at least one of a 3GPP New Radio (NR) specification, a 3GPP Long Term Evolution (LTE) specification, a MultiFire specification, a 802.11 specification, or any combination thereof.

10. The apparatus of claim 1, wherein the second raw data received at the first wireless communication device as though the second raw data originated from the sensor of the first wireless communication device.

11. A method comprising:
identifying, at a first wireless communication device, first raw data from a first sensor of a first wireless communication device;
identifying a second wireless communication device;
receiving, directly at the first wireless communication device, second raw data from a second sensor of the second wireless communication device, the second raw data received directly from the second wireless communication device in response to capture of the second raw data at the second sensor, where the second raw data is received at the first wireless communication device while the first wireless communication device is in communication with the second wireless communication device;
training one or more weights of a cooperative learning neural network, in the first wireless communication device using a combination of the first raw data and the second raw data received from the second sensor of the second wireless communication device, wherein the one or more weights are associated with one or more crash conditions or one or more objects, wherein said training comprises unsupervised training based on operation of the cooperative learning neural network, wherein, responsive to identifying that the second wireless communication device is within a threshold distance of the first wireless communication device, and responsive to the receiving of the second raw data, training the cooperative learning neural network at the first wireless communication device using the combination of the first raw data and the second raw data occurs while the second wireless communication device is within the threshold distance of the first wireless communication device, and training the cooperative learning neural network using the combination of the first raw data and the second raw data does not occur, otherwise; and
detecting at least one crash condition or an object using the trained one or more weights.

12. A wireless communication device comprising:
a sensor;
a transceiver, the transceiver configured to transmit first vehicle data from the sensor and directly receive second vehicle data from at least one other sensor of a second wireless communication device, the second vehicle data received directly from the second wireless communication device in response to capture of the second raw data at the second sensor, where the second vehicle data is received at the transceiver while the transceiver is in communication with the second wireless communication device, and the second vehicle data identifying the second wireless communication device; and
a cooperative learning neural network, the cooperative learning neural network configured to utilize both the first vehicle data and the second vehicle data received from the other sensor of the second wireless communication device to:
train the cooperative learning neural network, wherein the trained cooperative learning neural network comprises one or more weights associated with one or more crash conditions, wherein, responsive to identifying that the second wireless communication device is within a threshold distance of the wireless communication device, and responsive to the receiving of the second vehicle data, training the cooperative learning neural network at the wireless communication device using the combination of the first vehicle data and the second vehicle data occurs while the second wireless communication device is within the threshold distance of the wireless communication device, and training the cooperative learning neural network using the combination of the first vehicle data and the second vehicle data does not occur, otherwise; and
detect at least one crash condition based on the trained cooperative learning neural network;
a controller configured to adjust an operation of the wireless communication device based on the detection of the at least one crash condition.

13. The wireless communication device of claim 12, wherein the cooperative learning neural network is configured to calculate weights of the cooperative learning neural network based at least on the second vehicle data.

14. The wireless communication device of claim 13, wherein the transceiver is further configured to receive third vehicle data from another sensor, and wherein the cooperative learning neural network is configured to calculate the weights based further on the third vehicle data.

15. The wireless communication device of claim 12, further comprising a controller coupled to the cooperative learning neural network, and wherein the controller is configured to adjust a direction or speed, or both, of the vehicle responsive to the cooperative learning neural network.

16. The wireless communication device of claim 12, wherein the cooperative learning neural network is configured to identify a precursor to a crash condition.

17. The wireless communication device of claim 16, wherein the crash condition comprises at least one of a rear-end collision, a collision with a parked vehicle, a side-impact crash, an animal collision, or hydroplaning, or any combination thereof.

18. A method comprising:
receiving one or more weights of a cooperative neural network from a first wireless communication device at a second wireless communication device, wherein the one or more weights are trained to be associated with at least one or more crash conditions;
capturing raw sensor data at the second wireless communication device;
identifying a third wireless communication device;
utilizing the one or more weights of the cooperative neural network and the raw sensor data at the second wireless communication device to implement the cooperative neural network, in the second wireless communication device, for detection of a crash condition within a threshold time that is based at least in part on the crash condition, wherein the threshold time is based at least in part on receiving the one or more weights and detecting the crash condition, wherein, responsive to identifying that the third wireless communication device is within a threshold distance of the second wireless communication device, and responsive to the receiving the one or more weights, training the cooperative learning neural network at the second wireless communication device using the raw sensor data occurs while the third wireless communication device is within the threshold distance of the second wireless communication device, and training the cooperative learning neural network using the raw sensor data does not occur, otherwise;
adjusting a speed or direction, or both, of the second wireless communication device responsive to detection of the crash condition.

19. The method of claim 18, wherein the first wireless communication device and the second wireless communication device comprise vehicles.

20. The method of claim 18, wherein the raw sensor data further comprises sensor signals from one or more sensors of the first wireless communication device.

21. The method of claim 20, wherein capturing the raw sensor data of the second wireless communication device further comprises receiving, directly at the second wireless communication device, the sensor signals from the one or more sensors of the first wireless communication device, the sensors signals received at the second wireless communication device as though the sensor signals originated from a sensor of the second wireless communication device.

* * * * *

UNITED STATES PATENT AND TRADEMARK OFFICE
CERTIFICATE OF CORRECTION

PATENT NO. : 11,941,516 B2  
APPLICATION NO. : 15/693142  
DATED : March 26, 2024  
INVENTOR(S) : Fa-Long Luo et al.

Page 1 of 1

It is certified that error appears in the above-identified patent and that said Letters Patent is hereby corrected as shown below:

In the Claims

| Column | Line | Claim | Reads | Should read |
|---|---|---|---|---|
| 20 | 62 | 9 | a MultiFire specification, a 802.11 specification | a MulteFire specification, a IEEE 802.11 specification |

Signed and Sealed this  
Fourth Day of June, 2024

Katherine Kelly Vidal  
*Director of the United States Patent and Trademark Office*